(12) United States Patent
Chisholm et al.

(10) Patent No.: US 6,482,257 B1
(45) Date of Patent: Nov. 19, 2002

(54) SOLID SOLUTIONS OF MONOAZO PIGMENTS

(75) Inventors: Greig Chisholm, Glasgow (GB); Barry William Hay, Erskine (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/787,591

(22) PCT Filed: Oct. 19, 1999

(86) PCT No.: PCT/EP99/07893

§ 371 (c)(1),
(2), (4) Date: Mar. 20, 2001

(87) PCT Pub. No.: WO00/26303

PCT Pub. Date: May 11, 2000

(30) Foreign Application Priority Data

Oct. 31, 1998 (GB) ................................................ 9823803

(51) Int. Cl.[7] .......................... C09B 67/22; C09B 67/48; C09D 11/00
(52) U.S. Cl. ...................... 106/496; 106/31.8; 106/493; 106/494; 524/190
(58) Field of Search ................ 106/496, 31.8, 106/493, 494; 524/190

(56) References Cited

U.S. PATENT DOCUMENTS

| | | | |
|---|---|---|---|
| 2,189,806 A | 2/1940 | Lane et al. | 260/202 |
| 4,334,932 A | 6/1982 | Roueche | 524/191 |
| 5,821,373 A | 10/1998 | Hao et al. | 548/453 |

FOREIGN PATENT DOCUMENTS

| | | |
|---|---|---|
| EP | 0039307 | 11/1981 |
| EP | 0 649 883 | 4/1995 |
| EP | 0 763 572 | 3/1997 |
| EP | 0 784 086 | 7/1997 |
| GB | 517456 | 1/1940 |
| GB | 557415 | 11/1943 |

OTHER PUBLICATIONS

L. Dongzhi et al. 'An Investigation into the Synergism of Monoazoacetoacetanilide Pigments' vol. 18, No. 1, pp. 69–80 (1992) (No month).

Chem. Abst. vol. 116, No. 26, Jun. 29, 1992 No. 257360.

*Primary Examiner*—Anthony J. Green
(74) *Attorney, Agent, or Firm*—David R. Crichton

(57) ABSTRACT

Solid solutions of monoazo pigments comprising a host lattice and at least one guest material wherein the host lattice is a material having the general formula I or II, wherein compound of formula I is defined as

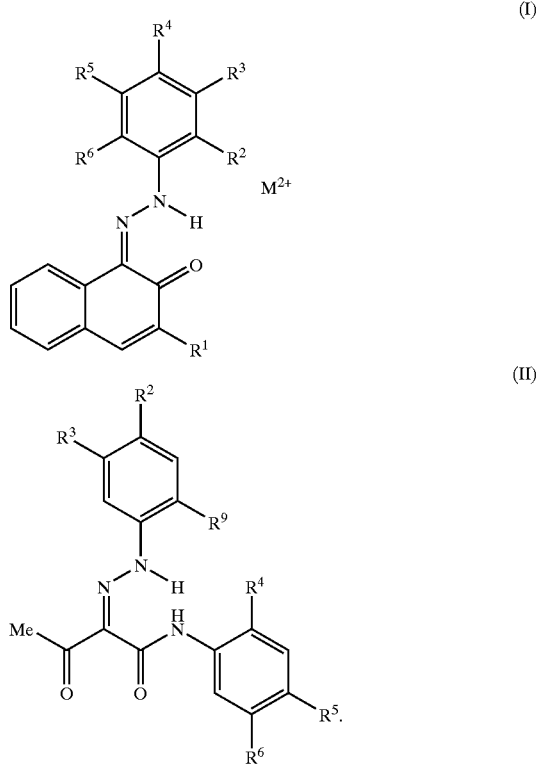

The guest material(s) have the same general formulae as their respective hosts with the proviso that they differ in molecular structure in at least one position from the respective hosts.

17 Claims, No Drawings

SOLID SOLUTIONS OF MONOAZO PIGMENTS

The present invention relates to solid solutions of monoazo pigments having desirable shade and colour strength characteristics. In particular the present invention relates to novel solid solutions of monoazo pigments, a process for their manufacture and their use in printing inks, ink varnishes, dyes and plastics compositions.

X-rays are electromagnetic radiation corresponding to a wavelength of approximately 100 picometers. When this radiation is passed through a crystalline material, diffraction can occur if the Bragg law is satisfied:

$$\lambda = 2d \sin \theta$$

Where $\lambda$ is equal to wavelength of the x-ray radiation, d is the spacing between the lattice planes and $\theta$ is the glancing angle, i.e. the angle the incident radiation makes with the lattice plane. When this technique is used on a powder sample it is known as powder X-ray diffraction (XRD), and is often used as a fingerprint in the identification of crystalline solids. Indeed a database of over 30,000 such diffraction patterns is maintained by the Joint Committee on Powder Diffraction Standards. Not only will different compounds generally exhibit different diffraction patterns, but different crystalline phases (polymorphs) of the same material will exhibit different patterns. Powder X-ray diffraction is particularly suitable for the identification of organic pigments, as they are most often prepared as powders of varying degrees of crystallinity. Each organic pigment provides a different diffraction pattern allowing easy determination of the identity and crystallinity of a sample.

It is common in the organic pigment industry to purposely prepare mixtures of different pigments to enhance specific desired properties such as shade and colour strength. Such mixtures can fall into three categories:

1. Simple physical mixtures where there are at least two species of different crystal structure. The resultant diffraction pattern of such a physical mixture of materials is simply the combination of the XRD of one sample overlaid on the XRD other material(s) XRD. In such cases it is possible to estimate the relative concentrations of each material in the mixture by analysis of the XRD.
2. A host-guest solid solution may be formed. In this case the crystal lattice of one of the materials acts as a host to the other material(s), which, instead of adopting its own unique crystal lattice is present as a guest in the lattice of the host material. In this case only the X-ray diffraction pattern of the host material is observed.
3. A new crystal form is produced by the mixing of two or more compounds. In this case the X-ray diffraction pattern corresponds to none of the individual materials present, but is a new and unique pattern.

The present invention relates to host-guest solid solutions and in particular the synergistic effects produced by the formation of solid solutions of monoazo pigments. Such effects are desirable as they provide improvements in the properties of such pigments. In particular the solid solutions of monoazo pigments according to the present invention provide improvements in colour strength, dispersion, gloss, increased transparency and a deeper masstone in inks, and improved heat stability in plastics.

The formation of solid solutions of diarylide yellow and high performance organic pigments is known for diarylide yellows and is documented *Dyes and Pigments,* 1992, 18, 69 and for high performance pigments in EP-A 704,497, EP-A 358,148 and EP-A 73,463. The effect of forming solid solutions of pigment materials is generally to form smaller crystals. Such changes in the crystal morphology are known to affect the colour strength, hiding power, heat stability and dispersion characteristics as discussed *Chemical Society Reviews,* 1997, 26, 203. The decrease in particle size is also thought to contribute to the depth of the masstone. The prior art method for the preparation of solid solutions of diarylide pigments requires the utility of two coupling materials and a single amine component. The prior art method for the preparation of high performance pigments is a multi-stage synthesis which does not involve a diazotisation reaction.

However the present invention relates to novel solid solutions of classical monoazo pigments which are formed by a process which requires the use of a single coupling component and at least two different amine materials which may be diazotised together. The present application provides a process for the formation of these novel monoazo pigment solid solutions and also demonstrates the technical advantages these solid solutions give over both the pure host material alone, as well as their advantages over a physical mixture of the solid solution components.

The present invention provides novel solid solutions of monoazo pigments comprising a host lattice and at least one guest material wherein the host lattice is a materials having the general formula I or II, wherein compound of formula I is defined as

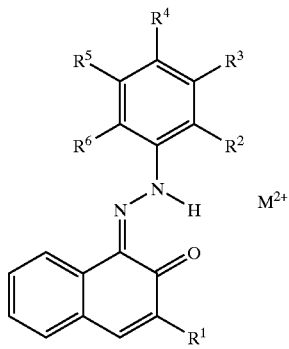

and wherein $R^1$=H, $CO_2$ or $CO_2R$, where R may be phenyl which can be substituted one to three times with the following substituents: $C_1$–$C_4$alkyl such as methyl, ethyl, n-, i-propyl, n-, i-, sec.- or tert.butyl, preferably methyl, $C_1$–$C_4$alkoxy such as methoxy, ethoxy, n-propoxy, n-butoxy, preferably methoxy, halogen such as Cl, Br or I, preferably Cl, $NO_2$ or —$NHC(O)CH_3$, $R^2$, $R^3$, $R^4$, $R^5$ and $R^6$, independently from each other may be $C_1$–$C_{20}$alkyl, $C_1$–$C_{20}$alkoxy, $C_2$–$C_{20}$alkenyl, $C_1$–$C_{20}$alkylthiol, $C_1$–$C_{20}$alkoxycarbonyl, hydroxy$C_1$–$C_4$alkoxy, phenyl, benzyl, phenylthio, halogen such as fluoro, chloro, bromo, iodo, —CN, —$NO_2$, —$CF_3$, —$COR^7$, —$COOR^7$, —$CONR^7R^8$, —$SO_2R^7$, —$SO_2NR^7R^8$, —$NR^7NR^8$ or —$OR_2$ in which each $R^7$ and $R^8$ are each independently H, $C_1$–$C_4$alkyl or phenyl; $M^{2+}$ is an earth alkaline metal cation such as $Ca^{2+}$, $Mg^{2+}$, $Sr^{2+}$, $Ba^{2+}$ or $Mn^{2+}$, and wherein formula II is defined as

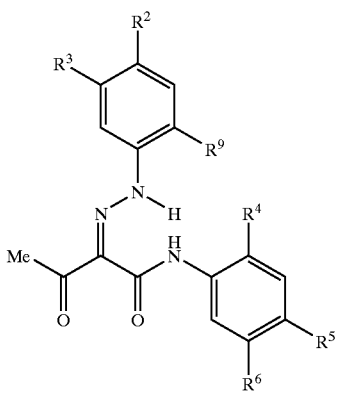

wherein $R^9$ stands for $C_1$–$C_{20}$alkyl, $C_1$–$C_{20}$alkoxy, $C_2$–$C_{20}$alkenyl, $C_1$–$C_{20}$alkylthiol, $C_1$–$C_{20}$alkoxycarbonyl, hydroxy$C_1$–$C_4$alkoxy, phenyl, benzyl, phenylthio, halogen such as fluoro, chloro, bromo, iodo, —CN, —NO$_2$, —CF$_3$, —COR$^7$, —COOR$^7$, —CONR$^7$R$^8$, —SO$_2$R$^7$, —SO$_2$NR$^7$R$^8$, NR$^7$NR$^8$ or —OR$_2$ in which each R$^7$ and R$^8$ are each independently H, $C_1$–$C_4$alkyl or phenyl, and wherein the guest material(s) have the same general formulae as their respective hosts with the proviso that they differ in molecular structure at at least one position from the respective hosts, i.e. at least one substituent $R^1$ to $R^9$ is chosen differently.

The solid solutions according to the present invention comprise a host material and at least one guest material which is incorporated in the lattice of the guest material. The X-ray diffraction pattern of the solid solutions according to the present invention are—according to observations up to now—equivalent to the X-ray diffraction pattern of the host material.

The limit of detection of one crystal phase (the guest material) in another (the host material) by powder X-ray diffraction is approximately 10%. It has been assumed herein, that, if at 10%; guest in 90% host a solid solution is formed, then a solid solution will also exist below the detection limit.

The amount of guest material(s) in the host can be chosen in the range of from 1 to 50 mol-%, preferably from 1 to 30 mol-%, more preferably from 5 to 20 mol-%, most preferably from 10 to 20 mol-%, based on the amount of the sum of host and guest. One or more guests, i.e. guest molecules of a different molecular structure, may be incorporated into the same host lattice.

Preferred host materials for use herein are either pigment red 57:1 or pigment yellow 111.

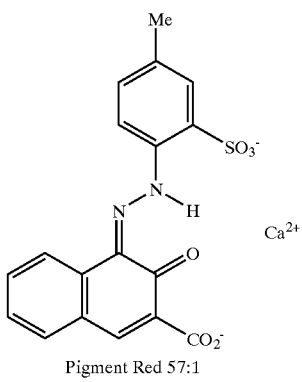

Pigment Red 57:1

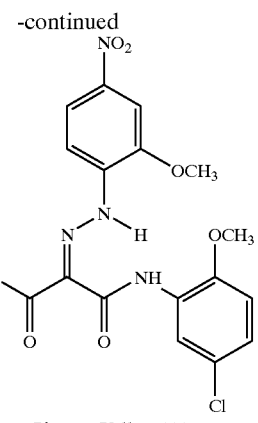

Pigment Yellow 111

Preferred guest materials for use herein in a host pigment red 57:1 crystal lattice have the general formula III illustrated below:

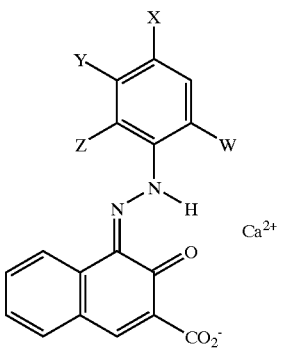

wherein W=SO$_3$H, NO$_2$, or CO$_2$H; X=Cl, CH$_3$, SO$_3$H, CO$_2$H or H; Y=CF$_3$ or H; and Z=Cl, CH$_3$ or H.

Preferred guest materials in the pigment yellow 111 crystal lattice have the general formula IV illustrated below:

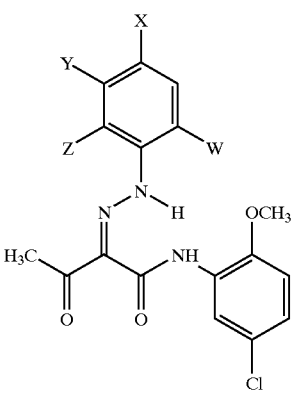

wherein W=SO$_3$H, NO$_2$, OCH$_3$ or CO$_2$H; X=Cl, CH$_3$, SO$_3$H, CO$_2$H or H; Y=CF$_3$ or H; and Z=Cl, CH$_3$ or H.

The final composition of the pigment may include such compounds as are commonly used as pigment additives, for example resins, dyestuffs and/or surfactants. Suitable resins include wood rosin, gum rosin, tall oil rosin, hydrogenated rosin, rosin esters, disproportionated rosin, dimerised rosin, polymerised rosin, phenolic rosin and carboxyl containing maleic or fumaric resin. The proportion of resin may vary over a wide range and may be for example 0.1 to 50% by weight based on the weight of the inventive pigment.

Suitable surfactants include anionic, cationic, amphoteric or non-ionic surfactants. Anionic surfactants which may be used are e.g. alkyl-, aryl- or aralkyl sulphates or sulphonates; alkyl-, aryl or aralkyl phosphates or phosphonates; or carboxylic acids. Cationic surfactants which may be used are e.g. primary, secondary or tertiary amines or quaternary salts of amines. Non-ionic surfactants which are suitable for use include long chain alcohols, alcohol or amine/ethylene oxide condensates, amine oxides or phosphine oxides and other castor oil derivatives. The amount of surfactant may vary over a wide range and may be, for example, 0.1 to 20% by weight based on the weight of the inventive pigment.

When a dyestuff is present, it is usually a water soluble version of the pigment containing such water solubilising groups as carboxyl or sulphonic acid groups. The amount of dyestuff may be from 1 to 20% by weight based on the weight of the inventive pigment.

The solid solutions of monoazo organic pigments according to the present invention are suitable for application in printing inks including oil inks and liquid inks, in particular liquid packaging inks, solvent based and aqueous paints and plastics. Such solid solutions may show in an improvement in one or more of the following properties depending on the application medium: dispersion, gloss, colour strength, transparency, and heat stability.

By way of illustration, the following methods may be used to prepare the solid solutions of the invention:

1. A mixture of amines appropriate to the solid solution being prepared is diazotised and is added to an aqueous solution or suspension of coupling components and surface treatments. Once coupling is completed the preparation is finished by appropriate pH adjustment and heat treatment.
2. A mixture of amines appropriate to the solid solution being prepared is diazotised and is added to an aqueous solution or suspension of coupling components. Once coupling is completed the preparation is finished by addition of appropriate surface treatments, pH adjustment and heat treatment.
3. A mixture of amines appropriate to the solid solution being prepared is diazotised and is added simultaneously with an aqueous solution or suspension of coupling components and surface treatments. Once coupling is completed the preparation is finished by appropriate pH adjustment and heat treatment.
4. A mixture of amines appropriate to the solid solution being prepared is diazotised and is added simultaneously with an aqueous solution or suspension of coupling components. Once coupling is completed the preparation is finished by addition of appropriate surface treatments, pH adjustment and heat treatment.
5. In addition to the methods detailed above the diazo components may be prepared separately, by the same or different methods and combined prior to coupling or added simultaneously to the coupling vessel.

EXAMPLES

As noted previously, the critical parameter defining a solid solution is that it should show only the diffraction pattern of the host crystal lattice. In the examples disclosed the host lattices are pigment red 57:1, 57:strontium lake and pigment yellow 111. Pigment red 57:1 can be characterised by high intensity reflections at $2\theta=5.0°$, 12.0°, 15.1°, 18.7°, 21.4°, 26.0°, and 27.4°. Pigment Red 57:strontium lake can be characterised by high intensity reflections at 4.9°, 13.5°, 18.3°, 21.0°, 25.8°, and 26.5°. Pigment yellow 111 can be characterised by high intensity reflections at $2\theta$ (Cu K $\alpha$)=9.8°, 10.9°, 21.0°, 23.8°, and 26.4°.

The examples disclosed on hand are characterised by the host lattice into which the guest is incorporated. No other reflections are seen which could be attributed to formation of a physical mixture of the pigments.

Example 1

2-aminonaphthalenesulphonic acid (0.1 g), 2-amino-4-trifluoromethylbenzene sulphonic acid (0.3 g) and 2-amino-5-methylbenzenesulphonic acid (24.6 g) are dissolved in a mixture of water (200 ml) and 47% by weight aqueous potassium hydroxide solution (16.8 g). The solution thus obtained is cooled to 0° C. by addition of ice. A 36–38% hydrochloric acid solution (30.0 g) is added with ice cooling to give a slurry. A solution of sodium nitrite (8.4 g) in water (25 ml) is prepared, and this is added gradually to the cooled slurry over 20 minutes to effect diazotisation. The temperature is maintained within the range 3 to 5° C. Addition of sodium nitrite is stopped when diazotisation is complete, as determined by conventional end-point analysis techniques. An aqueous solution (77–80% b.w.) of calcium chloride (25 g) is added.

A second vessel containing a mixture of water (120 ml) and 47% b.w. aqueous potassium hydroxide solution (5.8 g) is heated to 80° C. Staybelite® (a partially hydrogenated wood rosin manufactured by Hercules) (14.2 g) is added and stirred until dissolved, followed by a 47% aqueous solution of potassium hydroxide (16.8 g) and 2-hydroxy-3-naphthoic acid (25.5 g). The mixture is stirred until dissolved and gradually cooled to 20° C. with ice. A further addition of potassium hydroxide solution (9.4 g) is made.

Into a third vessel is added water (300 ml) at 5° C. The diazonium slurry and the rosin/2-hydroxy-3-naphthoic acid solution are then added simultaneously to this vessel such that the pH remains in the range 10.8–11.0. Once addition of the rosin/2-hydroxy-3-naphthoic acid solution is complete, pH control is via addition of dilute aqueous potassium hydroxide solution. The temperature is maintained at 5 to 8° C. by addition of ice. The coupling reaction is carried out over 45 minutes.

The red pigment slurry thus obtained is stirred for 1 hour. The pH is adjusted to 7.4 and the slurry is heated to 80° C. over 50 minutes. The slurry is cooled to 65° C. by addition of ice, and is filtered, washed with water and dried at 70° C. for 15 h, and heated for a further 4 h at 90° C. The resulting dried pigment is sieved through a 250 μm screen to give a powdered pigment composition.

Example 2

As example 1, except 2-amino-4-trifluoromethylbenzenesulphonic acid (1.6 g) and 2-amino-5-methylbenzenesulphonic acid (23.1 g) are added to the diazotisation vessel.

Example 3

As example 1, except 2-amino-3,5-dichlorobenzenesulphonic acid (0.3 g) and 2-amino-5-methylbenzenesulphonic acid (24.6 g) are added to the diazotisation vessel.

Example 4

As example 1, except 2-amino-3,5-dimethylbenzenesulphonic acid (0.5 g) and 2-amino-5-methylbenzenesulphonic acid (24.6 g) are added to the diazotisation vessel.

Example 5

As example 1, except 2-amino-3,5-dimethylbenzenesulphonic acid (5.2 g) and 2-amino-5-methylbenzenesulphonic acid (22.3 g) are added to the diazotisation vessel.

Example 6

As example 1, except 4-amino-3-nitrobenzoic acid (2.4 g) and 2-amino-5-methylbenzenesulphonic acid (21.9 g) are added to the diazotisation vessel.

Example 7

As example 1, except 4-amino-3-nitrobenzoic acid (11.8 g) and 2-amino-5-methylbenzenesulphonic acid (12.4 g) are added to the diazotisation vessel.

Example 8

As example 1, except 4-amino-3-nitrobenzenesulfonic acid (0.4 g) and 2-amino-5-methylbenzenesulphonic acid (24.6 g) are added to the diazotisation vessel.

Example 9 to 16

Printing inks are prepared by dispersing the solid solutions of monoazo pigments as obtained from examples 1 to 8 in a sheetfed varnish by a hand premix and 2 passes on a triple roll mill. These are compared with comparative inks made from a conventional (non-solid solution) pigment composition prepared using only the appropriate amount of 2-amino-5-methylbenzenesulphonic acid and 2-aminonaphthalenesulphonic acid. The results are given below. Dispersion and transparency are measured visually using the following scale: 1=very slight increase, 2=slight increase, 3=slight-moderate increase, 4=increase, 5=moderate-severe increase. Gloss and strength are measured as a percentage of the standard using an Erichson mini gloss meter and a Gretag D196 densitometer respectively, with higher values denoting increased gloss and strength.

TABLE 1

| example | pigment from | Dispersion | Transparency | Strength | Gloss |
|---|---|---|---|---|---|
| 9 | Example 1 | — | 2 | — | — |
| 10 | Example 2 | — | 2 | — | — |
| 11 | Example 3 | 2 | — | — | — |
| 12 | Example 4 | 2 | — | — | — |
| 14 | Example 6 | — | 2 | — | — |
| 15 | Example 7 | 3 | — | — | 109 |
| 16 | Example 8 | 2 | — | 109 | — |

Table 1 illustrates that each of the solid solutions of monoazo pigments according to the present invention displays improved perfomance when compared against a non-solid solution comparitive example.

Example 17

2-amino-4-trifluoromethylbenzenesulphonic acid (16.6 g) and 2-amino-5-methylbenezenesulphonic acid (13.2 g) are dissolved in a mixture of water (250 ml) and 47% b.w. aqueous sodium hydroxide solution (12.1 g). The solution thus obtained is cooled to 0° C. by addition of ice. A 36–38% hydrochloric acid solution (31.7 g) is added with ice cooling to give a slurry. A solution of sodium nitrite (9.4 g) in water (25 ml) is prepared, and this is added gradually to the cooled slurry over 20 minutes to effect diazotisation. The temperature is maintained within the range 3 to 5° C. Addition of sodium nitrite is stopped when diazotization is complete.

A second vessel containing a mixture of water (50 ml) and 47% b.w. aqueous sodium hydroxide solution (2.3 g) is heated to 80 0° C. Burez 9/18 (a maleic modified disproportionated wood rosin manufactured by Eka Nobel) (5.3 g) is added and stirred until dissolved.

To a third vessel is added water (250 ml), 47% aqueous solution of sodium hydroxide (24.2 g), 2-hydroxynaphthalene-6-sulphonic acid (2.0 g with a 80% purity) and 2-hydroxy-3-naphthoic acid (24.6 g). The mixture is stirred until dissolved before being combined with the contents of the second vessel. The temperature of the combined solutions is adjusted to 0 to 5° C. with ice.

The diazonium slurry is then added to this combined vessel over 30 minutes, maintaining the temperature at 0 to 5° C. The pH is allowed to fall to 11.3 and is then maintained in the range 11.3 to 11.5 by addition of dilute aqueous sodium hydroxide solution.

A 77 to 80% b.w. solution of calcium chloride (28.8 g) in water (100 ml) is added. The red pigment slurry thus obtained is stirred for 1 hour. The slurry is heated to 70° C. and held at this temperature for 10 minutes. The pH is adjusted to fall within the range 7.2 to 7.5 with dilute aqueous hydrochloric acid. The slurry is filtered, washed with water and dried at 70° C. for 15 h, and heated for a further 4 h at 90° C. The resulting dried pigment is sieved through a 250 μm screen to give a powdered pigment composition.

Example 18

A printing ink is prepared by dispersing the pigment composition obtained in Example 17 in an alcohol/nitrocellulose ink vehicle using a beadmill. These are compared with control inks made from a pigment composition prepared by an identical process to example 17, but omitting the 2-amino-4-trifluoromethylbenzenesulphonic acid and using the appropriate amount of 2-amino-5-methylbenzenesulphonic acid. Both gloss and transparency are measured visually as detailed for examples 9–16.

Gloss: 2; transparency: 5.

Example 19

2-aminonaphthalenesulphonic acid (0.2 g), 2-amino-4-trifluoromethylbenzenesulphonic acid (2.4 g) and 2-amino-5-methylbenzenesulphonic acid (17.4 g) are dissolved in a mixture of water (260 ml) and 47% b.w. aqueous sodium hydroxide solution (9.0 g). The solution thus obtained is cooled to 0° C. by addition of ice. A solution of sodium nitrite (6.5 g) in water (25 ml) is prepared, and the bulk of this is added to the amine solution. A 36–38% aqueous hydrochloric acid solution (25.0 g) is added with ice cooling. The remainder of the nitrite solution is added gradually to the cooled slurry over 20 minutes to effect diazotisation. The temperature is maintained below 10° C. Addition of sodium nitrite is stopped when diazotisation is complete. A 77 to 80% b.w. solution calcium chloride (24.8 g) in water (100 ml) is added.

A second vessel containing a mixture of water (130 ml) and 47% b.w. aqueous sodium hydroxide solution (2.9 g) is heated to 70° C. Portuguese WW resin (a gum rosin manufactured by Langley Smith and Co.) (8.8 g) is added and the resultant mixture is stirred until a complete solution is obtained. The solution is cooled to 10° C.

Into a third vessel is added water (300 ml), followed by a 47% b.w. aqueous solution of sodium hydroxide (9.5 g) and 2-hydroxy-3-naphthoic acid (19.2 g). The mixture is stirred until dissolved and gradually cooled to 10° C. with ice.

The contents of the resin and 2-hydroxy-3-naphthoic acid vessels are combined. The diazo slurry is then added over 30 minutes ensuring the temperature remains below 10° C. When the pH reaches the range 11.2 to 11.4, it is maintained at this level by addition of dilute aqueous sodium hydroxide.

The red pigment slurry thus obtained is stirred for 1 hour. The pH is adjusted to 7.5 using dilute aqueous hydrochloric acid and the slurry is heated to 70° C. The slurry is cooled to 65° C. by addition of ice, and is filtered, washed with water and dried at 70° C. for 15 h, and heated for a further 4 h at 90° C. The resulting dried pigment is sieved through a 250 μm screen to give a powdered pigment composition.

Example 20

The procedure of example 19 is repeated but using 0.2 g of 2-amino-naphthalenesulphonic acid, 4.9 g of 2-amino-4-trifluoromethylbenzenesulphonic acid and 15.4 g of 2-amino-5-methylbenzenesulphonic acid.

Example 21

The powdered pigment preparations prepared in examples 19 and 20 are dispersed in high density polyethylene and tested for their heat stability in this medium. Control plastics are prepared by dispersing pigment preparations prepared in an identical manner to examples 19 and 20, but omitting the 2-amino-4-trifluoromethylbenzenesulphonic acid and using the appropriate amount of 2-amino-5-methylbenzenesulphonic acid. The heat stability is measured as the final observed temperature where ΔE is <1.6. This equates to a noticeable difference in the appearance of the plastic.

TABLE 2

| Sample | Heat Stability (° C.) |
|---|---|
| Control | 200 |
| Example 19 | 220 |
| Example 20 | 240 |
| Control (white reduction) | 220 |
| Example 19 (white reduction) | 240 |
| Example 20 (white reduction) | 260 |

Example 22

2-methoxy-4-nitroaniline (17.7 g) and water (100 ml) are stirred into a paste. A 36–38 % aqueous hydrochloric acid solution (16.6 g) is added and the resulting solution is stirred for 30 minutes. The temperature is lowered to 0° C. with crushed ice. A solution of sodium nitrite (7.4 g) in water (25 ml) is prepared, and the bulk of this is added to the amine solution. The remainder of the nitrite solution is added gradually to the cooled slurry over 30 minutes to effect diazotisation. Sequestrene (0.3 g), Celite J2 (0.2 g) and Actibon C (0.2 g) are added and the diazotised solution is filtered.

In a second vessel 2-amino-3,5-dichlorobenzenesulphonic acid (2.8 g) is dissolved in a mixture of water (50 ml) and 47% b.w. aqueous sodium hydroxide solution (1.2 g). The solution thus obtained is cooled to 0° C. by addition of ice. A 36–38% aqueous hydrochloric acid solution (1.8 g) is added with ice cooling. A solution of sodium nitrite (0.8 g) in water (10 ml) is prepared, and the bulk of this is added to the amine solution. The remainder of the nitrite solution is added gradually to the cooled slurry to effect diazotisation. The temperature is maintained below 5° C. A 77 to 80% b.w. aqueous solution of calcium chloride (2.8 g) is added. The contents of the first two vessels are combined, maintaining the temperature below 5° C.

Acetoacet-o-methoxy-m-chloroanilide (28.1 g) is added to water (100 ml). A 47% b.w. aqueous solution of sodium hydroxide (10 ml) is added, and the mixture stirred until dissolved. The temperature of the solution is reduced to 0° C. by addition of ice, and the volume is adjusted to 230 ml with water.

The diazo solution is added to the acetoacet-o-methoxy-m-chloroanilide vessel over 1 hour, maintaining the temperature below 15° C. When the reaction has gone to completion, a further addition of acetoacet-omethoxy-m-chloroanilide (2.6 g) in water (50 ml) and 47% b.w. aqueous sodium hydroxide (2 ml) is made. The addition of the diazo is continued until an end point is reached.

The pigment slurry thus obtained is heated to 70° C. over 20 minutes and is filtered, washed with water and dried at 70° C. for 15 h. The resulting dried pigment is sieved through a 250 μm screen to give a powdered pigment composition.

Example 23

Procedure of example 22 is repeated but using 2-methoxy-4-nitroaniline (15.7 g) and 2-amino-3,5-dichlorobenzenesulphonic acid (5.7 g).

Examples 24 to 25

A printing ink is prepared by dispersing the pigment composition obtained in examples 22 and 23 in an alcohol/nitrocellulose ink vehicle using a beadmill. These are compared with control inks made from a pigment composition prepared by an identical process to example 22, but omitting the 2-amino-3,5-dichlorobenzenesulphonic acid and using only the appropriate amount of 2-methoxy-4-nitroaniline. Gloss and transparency are measured visually as detailed for the transparency measurements in examples 9 to 16. A positive result indicating a glossier or more transparent sample.

TABLE 3

| | printing inks | | |
|---|---|---|---|
| example | pigment composition of | Transparency | Gloss |
| 24 | example 22 | 4 | 3 |
| 25 | example 23 | 5 | 4 |

Example 26–27

Printing inks are prepared by dispersing the pigment compositions obtained in examples 7 and 8 in the same way as examples 9–16. Control inks are made with inks prepared using a physical mixture of the components of the solid solution. Colour strength is measured by a Gretag D196 densitometer. Results are expressed as a percentage of the control ink with higher values indicating superior performance.

TABLE 4 printing inks

| pigment composition of | Strength compared to standard | standard (control inks) |
|---|---|---|
| example 26 | 106% | physical mixture of 1% 4-amino-3-nitrobenzoic acid onto 2-hydroxy-3-naphthoic acid with 99% pigment red 57:1 |
| example 27 | 122% | physical mixture of 50% 4-amino-3-nitrobenzoic acid onto 2-hydroxy-3-naphthoic acid with 50% pigment red 57:1 |

Example 28

2-aminonaphthalenesulphonic acid (0.1 g), 2-amino-4-trifluoromethylbenzenesulphonic acid (3.2 g) and 2-amino-5-methylbenzenesulphonic acid (22.3 g) are dissolved in a mixture of water (200 ml) and 47% b.w. aqueous potassium hydroxide solution (16.8 g). The solution thus obtained is cooled to 0° C. by addition of ice. A 36–38% hydrochloric acid solution (30.0 g) is added with ice cooling to give a slurry. A solution of sodium nitrite (8.4 g) in water (25 ml) is prepared, and this is added gradually to the cooled slurry over 20 minutes to effect diazotisation. The temperature is maintained within the range 0 to 5° C. Addition of sodium nitrite is stopped when diazotisation is complete.

A second vessel containing a mixture of water (120 ml) and 47% b.w. aqueous potassium hydroxide solution (5.8 g) is heated to 80° C. Staybelite® (14.2g) is added and stirred until dissolved, followed by a 47% b.w. aqueous solution of potassium hydroxide (16.8 g) and 2-hydroxy-3-naphthoic acid (25.5 g). The mixture is stirred until dissolved and gradually cooled to 20° C. with ice. A further addition of potassium hydroxide solution (9.4 g) is made.

Into a third vessel is added water (300 ml) at 5° C. The diazonium slurry and the rosin/2-hydroxy-3-naphthoic acid solution are then added simultaneously to this vessel such that the pH remains in the range 10.8 to 11.0. Once addition of the rosin/2-hydroxy-3-naphthoic acid solution is complete, pH control is via a dilute aqueous potassium hydroxide solution. The temperature is maintained at 5 to 8° C. by addition of ice. The coupling reaction is carried out over 45 minutes.

The red pigment slurry thus obtained is stirred for 1 hour. The slurry is heated to 5° C. and a solution of strontium nitrate (49.0 g) in water (100 ml) is added. Heating is continued to 80° C. over 30 minutes. The pH is adjusted to 7.4 and the temperature is maintained at 80° C. for a further 30 minutes. The slurry is cooled to 65° C. by addition of ice, and is filtered, washed with water and dried at 70° C. for 15 h, and heated for a further 4 h at 90° C. The resulting dried pigment is sieved through a 250 μm screen to give a powdered pigment composition.

Example 29

A printing ink is prepared by dispersing the pigment composition obtained in example 28 in an oil ink vehicle using a muller. A control inks is made with a physical mixture of the components of the solid solution in example 28. Colour strength is measured by a Gretag D196 densitometer. Results are expressed as a percentage of the control ink with higher values indicating superior performance: strength: 110%.

What is claimed is:

1. A solid solution of monoazo pigments comprising a host lattice and at least one guest material, wherein the host lattice is pigment red 57:1 or pigment yellow 111 and the guest material in host pigment red 57:1 has the general formula III

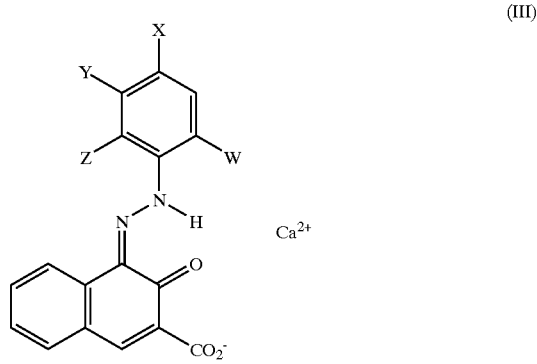

(III)

wherein W=$SO_3H$, $NO_2$, or $CO_2H$; X=Cl, $CH_3$, $SO_3H$, $CO_2H$ or H; Y=$CF_3$ or H; and Z=Cl, $CH_3$ or H, and the guest material in host pigment yellow 111 has the general formula IV

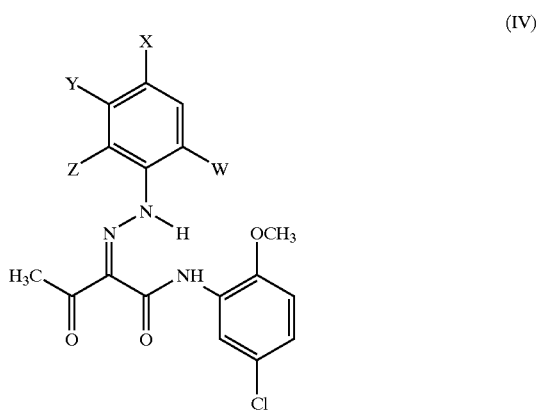

(IV)

wherein W=$SO_3H$, $NO_2$, $OCH_3$ or $CO_2H$; X=Cl, $CH_3$, $SO_3H$, $CO_2H$ or H; Y=$CF_3$ or H; and Z=Cl, $CH_3$ or H.

2. A solid solution of monoazo pigments according to claim 1 wherein the guest material is present in the host lattice in an amount of from 1 to 50 mol-%, based on the amount of host and guest.

3. A pigment composition comprising the solid solution of monoazo pigments according to claim 1 in combination with additive materials selected from the group consisting of resins, dyestuffs, surfactants and mixtures thereof.

4. A method for preparing a pigment composition according to claim 3 which comprises combining the solid solution of monoazo pigments with the additive materials selected from the group consisting of resins, dyestuffs, surfactants and mixtures thereof.

5. A method for preparing a printing ink comprising incorporating a solid solution of monoazo pigments according to claim 1 into an ink composition.

6. Printing inks comprising a coloristically effective amount of a solid solution of monoazo pigments according to claim 1.

7. A pigment composition comprising the solid solution of monoazo pigments according, to claim 2 in combination with additive materials selected from the group consisting of resins, dyestuffs, surfactants and mixtures thereof.

8. A method for preparing a pigment composition comprising combining a solid solution of monoazo pigments according to claim 1 with additive materials selected from the group consisting of resins, dyestuffs, surfactants and mixtures thereof.

9. A method for preparing a plastic composition comprising incorporating a solid solution of monoazo pigments according to claim 1 into a high molecular weight polymeric resin material.

10. A method for preparing a printing ink comprising incorporating a solid solution of monoazo pigments according to claim 1 into an ink composition.

11. A method for preparing a plastic composition comprising incorporating a solid solution of monoazo pigments according to claim 2 into a high molecular weight polymeric resin material.

12. A method for preparing a printing ink comprising incorporating a pigment composition according to claim 3 into an ink composition.

13. A method for preparing a plastic composition comprising incorporating a pigment composition according to claim 3 into a high molecular weight polymeric resin material.

14. Printing inks comprising a coloristically effective amount of a solid solution according to claim 2.

15. Printing inks comprising a coloristically effective amount of a pigment composition according to claim 3.

16. Plastic compositions comprising a coloristically effective amount of a solid solution according to claim 1 and a high molecular weight polymeric resin material.

17. Plastic compositions comprising a coloristically effective amount of a solid solution according to claim 2 and a high molecular weight polymeric resin material.

* * * * *